Feb. 1, 1949.  D. E. KELLER  2,460,509
HEATED DRINKING VESSEL
Filed Sept. 21, 1946
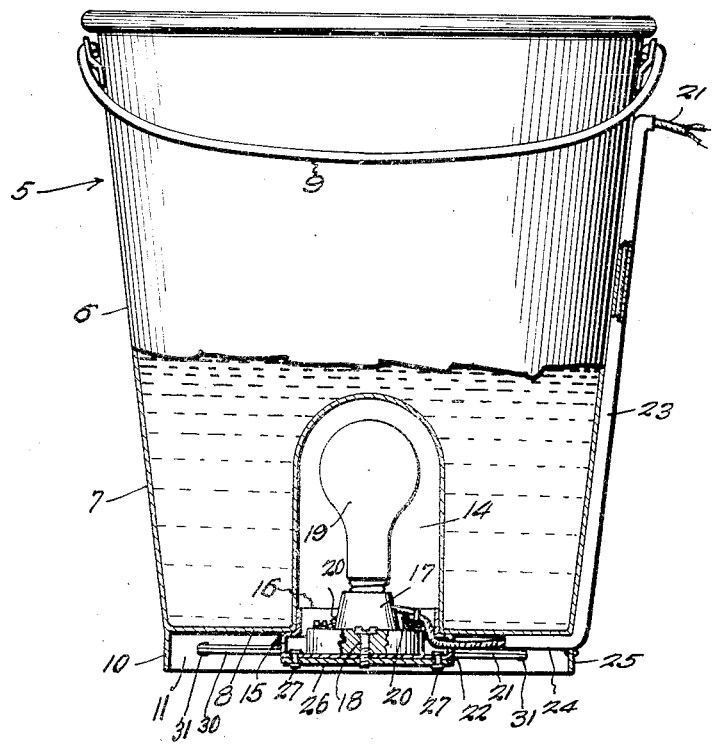
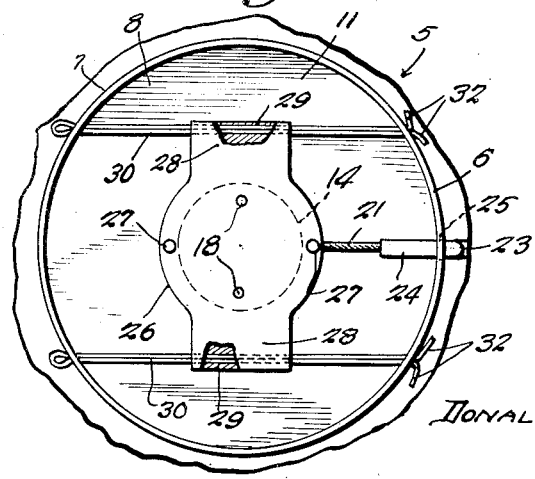
Inventor
DONALD E. KELLER
By Clarence A. O'Brien
and Harvey B. Jacobson
Attorneys

UNITED STATES PATENT OFFICE 2,460,509

HEATED DRINKING VESSEL

Donald E. Keller, Millersport, Ohio

Application September 21, 1946, Serial No. 698,471

2 Claims. (Cl. 219—45)

This invention relates to new and useful improvements and structural refinements in drinking vessels, and the principal object of the invention is to provide a device of the character herein described, the contents of which are electrically heated and which is particularly adapted for winter use by poultry.

A further object of the invention is to provide a heated drinking vessel which is simple in construction and operation, economical in use, and which may be easily kept clean.

Another object of the invention is to provide a heated drinking vessel which, being light in weight, may be easily carried, and which will not readily become damaged.

A still further object of the invention is to provide a heated drinking vessel which will readily lend itself to economical manufacture and which is otherwise well adapted for the purpose for which it is intended.

With the above more important objects in view, and such other objects as may become apparent as this specification proceeds, the invention consists essentially of the arrangement and construction of parts as illustrated in the accompanying drawings, in which:

Figure 1 is a side elevation of the invention, the same being partially broken away to reveal its construction, and Figure 2 is an underside plan view, also partially broken away, of the device shown in Figure 1.

Like characters of reference are used to designate like parts in the specification and throughout the several views.

Referring now to the accompanying drawings in detail, the invention consists of a heated drinking vessel designated generally by the reference character 5, the same embodying in its construction a bucket-like container 6 formed by a substantially frusto-conical circumferential wall 7 and an imperforate bottom 8.

The container 6 is, of course, open at the upper end thereof and is provided with a suitable carrying handle 9 of conventional design. It will be also noted that the lateral wall 7 is extended at the lower edge thereof by a circumferential flange 10, the latter projecting below the bottom 8 and defining a space or enclosure 11, as is best shown in Figure 1.

The imperforate bottom 8 is provided with a centrally disposed reentrant pocket 14, and a cover 15, disposed in the space 11, is provided with a neck portion 16 which is removably receivable in the pocket 14, substantially as shown.

A suitable socket 17 is secured to the cover 15 by a plurality of bolts or screws 18, and is provided with an incandescent lamp 19, the latter being receivable in the pocket 14. The electric current is delivered to the lamp by means of a pair of suitable conductors 20, the same being combined to form a cable 21 which passes through an opening 22 provided in the cover 15 and is protected by a tubular conduit 23. This conduit is secured to the lateral wall 7 of the container 6 and the lower end portion thereof is angulated as at 24 in order to enter the enclosure 11 through an opening 25 formed in the flange 10.

Further means are also provided for retaining the cover 15 in position, the same comprising a plate 26 secured to the cover by suitable bolts or rivets 27 and formed with a pair of projecting ears 28. The outer end portions of these ears are formed with transversely extending bores 29, these being adapted to removably receive cotter-shaped retaining pins 30.

Each of these pins passes through a pair of apertures 31 provided in the flange 10 and the free end portions of the pins may be angulated as at 32, for obvious reasons.

When the invention is placed in use, the cable 21 is connected to a suitable source of current, and the heat of the incandescent lamp 19 will be dissipated into the contents of the container 6, whereby the same will become heated. It should be noted that by virtue of the position in which the lamp is mounted, virtually all of the heat emanating therefrom will be absorbed by the liquid in the container, so that the device will function with considerable efficiency.

The lamp 19 is readily accessible for purposes of inspection or replacement by simply removing the retaining pins 30 from the apertures 31 and from the bores 29, whereupon the plate 26 and the associated cover 15 may be readily removed from the pocket 14.

It is believed that the advantages and use of the invention will be clearly understood from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. In a heated drinking vessel, the combination of a container having an imperforate bottom formed with a reentrant pocket and provided at the marginal edge of said bottom with a downwardly extending flange, a heating element supporting cover provided under said bottom and formed with a neck portion removably receivable in said pocket, and a plurality of removable keeper rods extending through said flange and through said cover to retain the neck portion of said cover in said pocket.

2. The device as defined in claim 1 wherein said cover includes laterally projecting ears formed with transverse bores to slidably receive said rods.

DONALD E. KELLER.

REFERENCES CITED

The following references are of record in the file of this patent:

UNITED STATES PATENTS

| Number | Name | Date |
| --- | --- | --- |
| 1,366,916 | La Belle | Feb. 1, 1921 |
| 1,569,738 | Forshee | Jan. 12, 1926 |
| 1,707,425 | Baker | Apr. 2, 1929 |
| 1,787,703 | Rau | Jan. 6, 1931 |
| 1,821,478 | Pledger | Sept. 1, 1931 |